United States Patent [19]

Furuya

[11] Patent Number: 5,193,069
[45] Date of Patent: Mar. 9, 1993

[54] PORTABLE COMPUTER TO WHICH DIFFERENT TYPES OF FLAT DISPLAY PANELS CAN BE ATTACHED

[75] Inventor: Seiichi Furuya, Fussa, Japan

[73] Assignee: Kabushiki Kaisha Toshiba, Kawasaki, Japan

[21] Appl. No.: 829,628

[22] Filed: Jan. 31, 1992

Related U.S. Application Data

[63] Continuation of Ser. No. 514,027, Apr. 27, 1990, abandoned.

[30] Foreign Application Priority Data

Apr. 28, 1989 [JP] Japan ............................ 1-51217[U]

[51] Int. Cl.⁵ .............................................. G06F 1/00
[52] U.S. Cl. ..................................................... 364/708
[58] Field of Search ............... 364/708; 361/380, 391, 361/394; 340/793

[56] References Cited

U.S. PATENT DOCUMENTS

| | | | |
|---|---|---|---|
| Re. 33,532 | 2/1991 | Ishii | 340/793 |
| 4,680,674 | 7/1987 | Moore | 364/708 X |
| 4,749,364 | 6/1988 | Arney et al. | 439/372 |
| 4,823,120 | 4/1989 | Thompson et al. | 340/703 |
| 4,926,365 | 5/1990 | Hsieh | 364/708 |
| 4,980,678 | 12/1990 | Zenda | 340/716 |

OTHER PUBLICATIONS

"Removable Liquid Crystal Display for a Personal Computer", IBM Technical Disclosure Bulletin vol. 29 No. 10 Mar. 1987, pp. 4273-4274.

*Primary Examiner*—Tan V. Mai
*Attorney, Agent, or Firm*—Cushman, Darby & Cushman

[57] ABSTRACT

In a system of this invention, either a first type flat panel display unit or a second type flat panel display unit which is different in type from the first type flat panel display unit can be selectively, mechanically, and electrically connected and disconnected to and from a base unit. The base unit includes a power supply for applying a reference voltage, and applies the reference voltage to a display unit which is mechanically and electrically connected therto. The first type flat panel display unit is driven by the reference voltage. The second type flat panel display unit includes a voltage converter, and is driven by a voltage converted from the reference voltage. With the above arrangement, the system can use a plurality of flat panel display units with one base unit.

6 Claims, 4 Drawing Sheets

PORTABLE COMPUTER TO WHICH DIFFERENT TYPES OF FLAT DISPLAY PANELS CAN BE ATTACHED

This is a continuation of application Ser. No. 07/514,027, filed on Apr. 27, 1990, now abandoned.

BACKGROUND OF THE INVENTION

1. Field of the Invention

The present invention relates to a system, such as a laptop type portable computer or a laptop type wordprocessor, wherein a flat panel display unit is connected to a main body and, more particularly, to a system wherein a flat panel display unit can be detached from a main body.

2. Description of the Related Art

In recent years, laptop type portable computers having main bodies to which large-size flat panel display units are rotatably connected have been widely used. These laptop type portable computers are disclosed in, e.g., U.S. Pat. Nos. 4,497,036, 4,571,456, 4,667,299, 4,730,364, 4,739,316, 4,742,478, 4,749,364, 4,781,422, 4,839,837, 4,846,536, 4,852,033, 4,684,523, 4,894,792, 4,901,261, and 4,903,221.

Of these laptop type portable computers, display detachable type portable computers disclosed in, e.g., U.S. Pat. No. 4,749,364, U.S. patent application Ser. Nos. 07/428,772, and 07/406,614 have flat panel display units detachable from computer main bodies. A display detachable type portable computer of this type is used in the following two types of operation modes. In the first operation mode, a flat panel display unit is electrically and mechanically connected to a computer main body. In the second operation mode, the flat panel display unit is detached from the computer main body, and the computer main body is electrically connected to a CRT display unit. An operator normally operates the display detachable type portable computer in the first operation mode. Since currently available flat panel displays have low resolutions, when an operator wants to see high-resolution images, he/she electrically connects a computer body to a CRT display unit. When the operator uses the computer main body by connecting it to the CRT display unit, he/she detaches the flat panel display unit from the computer main body because it interferes with this type of operation. In this case, therefore, the operator operates the computer main body without the flat panel display unit.

Although the flat panel display unit can be detached from the main body of the above-described display detachable type portable computer, a flat panel display unit to be mounted on one type of portable computer is limited to only one type. Various types of flat panel displays are currently available, e.g., a reflection type liquid crystal display for reflecting external light, a transmission type liquid crystal display for receiving light from the rear surface, a color liquid crystal display, and a plasma display. In spite of these various types of displays, a user can use only one type of flat panel display for one type of display detachable type portable computer because the physical and electrical specifications of a computer body are matched with only one type of display.

SUMMARY OF THE INVENTION

It is an object of the present invention to provide a system wherein a plurality of types of flat panel displays can be selectively, mechanically, and electrically connected to one type of main body.

It is another object of the present invention to provide a system wherein a plurality of types of display units having different driving voltages can be selectively, mechanically, and electrically connected to one type of main body.

It is still another object of the present invention to provide a system wherein a transmission type liquid crystal display and a reflection type liquid crystal display can be selectively, electrically, and mechanically connected to one type of main body.

It is still another object of the present invention to provide a system wherein a monochromatic liquid crystal display and a color liquid crystal display can be selectively, electrically, and mechanically connected to one type of main body.

A system of the present invention comprises a main body, a first flat panel display unit detachably mounted on the main body, and a second flat panel display unit which i different in type from the first flat panel display unit and is detachably mounted on the main body. The main body includes a first mechanical connecting portion, a first connector, a display controller electrically connected to the first connector, and a power supply, electrically connected to the first connector, for applying a reference voltage thereto. The first flat panel display unit includes a first flat panel display, a second mechanical connecting portion detachably and mechanically connected to the first mechanical connecting portion, a second connector detachably and electrically connected to the first connector, and a first display circuit for displaying data from the display controller through the first and second connectors and displaying data on the first flat panel display in a first display method upon reception of the reference voltage from the power supply. The second flat panel display unit includes a second flat panel display, a third mechanical connecting portion detachably and mechanically connected to the first mechanical connecting portion, a third connector detachably and electrically connected to the first connector, and a second display circuit for displaying data from the display controller through the first and third connectors and displaying data on the second flat panel display by a second display method upon reception of the reference voltage from the power supply.

In the system of the present invention, the second mechanical connecting portion of the first flat panel display unit or the third mechanical connecting portion of the second flat panel display unit can be mechanically connected to the first mechanical connecting portion of the main body, and at the same time, the second connector of the first flat panel display unit or the third connector of the second flat panel display unit can be electrically connected to the first connector of the main body. With this arrangement, a user can use a plurality of types of flat panel display units for one main body. That is, the user can enjoy a wide range of choice with regard to flat panel display units. In addition, a currently used old type flat panel display unit can be easily replaced with a newly developed high-performance flat panel display unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

A system according to an embodiment of the present invention will be described below with reference to the accompanying drawings.

Figure 1:
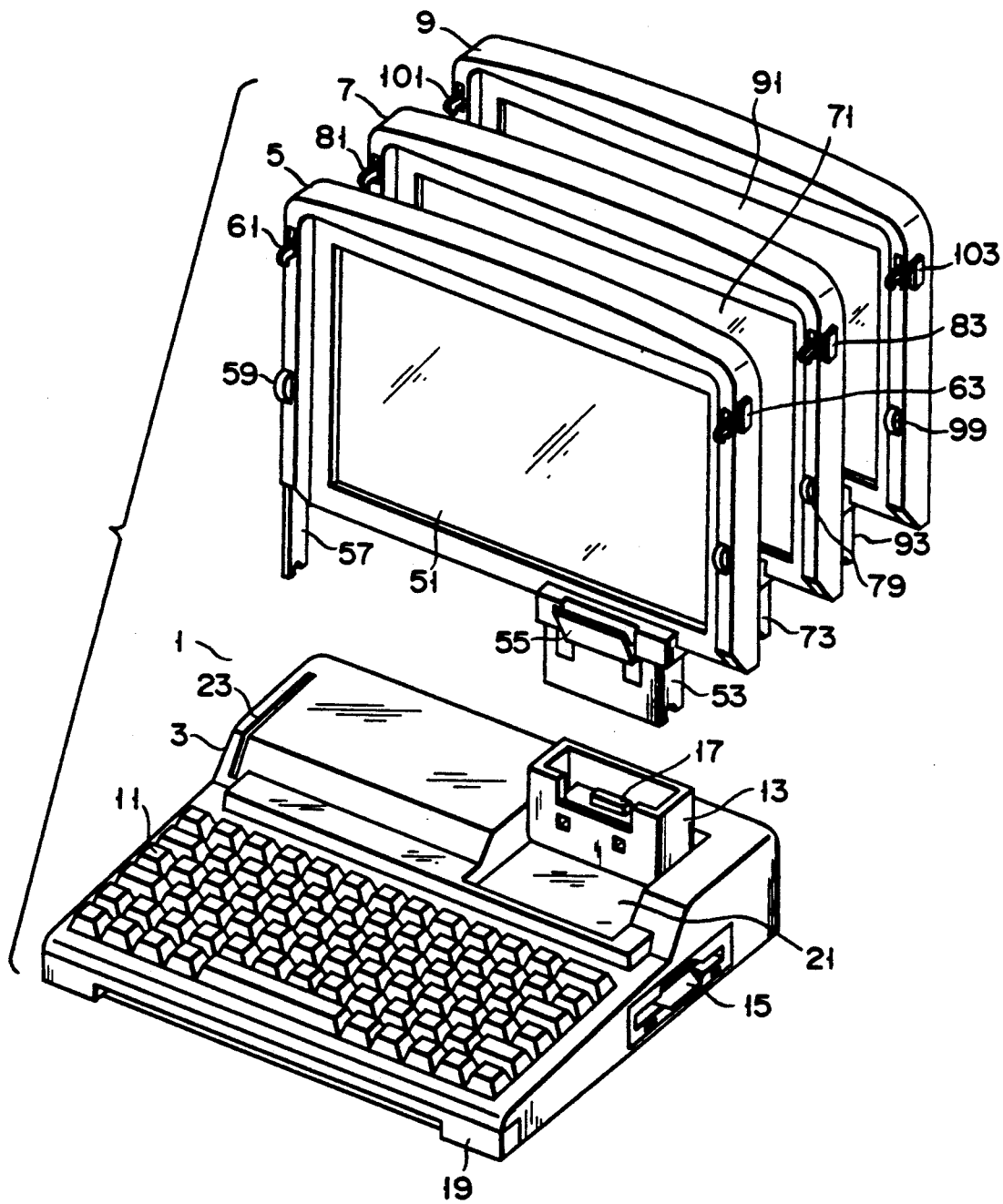
FIG. 1 is a perspective view, showing an outer appearance of a system of the present invention, for explaining its arrangement.

FIG. 1 is a perspective view for explaining an arrangement of the system according to the present invention. A system 1 of the present invention includes a base unit 3, a back-light type liquid crystal display unit 5, a reflection type liquid crystal display unit 7, and a color type liquid crystal display unit 9. The base unit 3 has a front portion and a rear portion. The front portion has a keyboard unit 11 and a slidable handle 19 respectively arranged on its upper surface and front end surface. The rear portion has a socket mounted hollow 21 and a leg mounted groove 23. A socket 13 is rotatably connected to the socket mounted hollow 21. A first connector 17 is fixed in the socket 13. In addition, the base unit 3 has a floppy disk drive 15.

The back-light type liquid crystal display unit 5 includes a display unit case, a back-light type liquid crystal display 51 housed in the display unit case, a first leg 53 which is fixed to the display unit case and is detachably and mechanically connected to the socket 13, a second leg 57 which is fixed to the display unit case and is detachably and rotatably connected to the base unit 3 in the leg mounted groove 23, a pair of first latches 61 respectively engaged with a pair of holes in both ends of the keyboard 11, a pair of first springs 59 for causing the display unit 4 to hop up, and a pair of first slide buttons 63 for respectively actuating the pair of first latches 61. A second connector is fixed in the first leg 53. When the first leg 53 is mechanically connected to the socket 13, the second connector is electrically connected to the first connector 17. A first rotatable lever 55 is rotatably fixed to the first leg 53. The first rotatable lever 55 has a pair of second latches which are respectively engaged with a pair of holes in the front surface of the socket 13.

Similar to the back-light type liquid crystal display unit 5, the reflection type liquid crystal display unit 7 includes a display unit case, a reflection type liquid crystal display 71 housed in the display unit case, a third leg 73 which is fixed to the display unit case and is detachably and mechanically connected to the socket 13, a fourth leg which is fixed in the display unit case and is detachably and rotatably connected to the base unit 3 in the leg (not shown) mounted groove 23, a pair of third latches 81 respectively engaged with the pair of holes in both ends of the keyboard unit 11, a pair of second springs 79 for causing the display unit 7 to hop up, and a pair of second slide buttons 83 for respectively actuating the pair of third latches 81. A third connector is fixed in the third leg 73. When the third leg 73 is mechanically connected to the socket 13, the third connector electrically connected to the first connector 17 is fixed in the first leg 53. A second rotatable lever is rotatably fixed to the third leg 73. The second rotatable lever has a pair of fourth latches which are respectively engaged with the pair of holes in the front surface of the socket 13.

Similar to the back-light type liquid crystal display unit 5 and the reflection type liquid crystal display unit 7, the color type liquid crystal display unit 9 includes a display unit case, a color type liquid crystal display 91 housed in the display unit case, a fifth leg 93 which is fixed to the display unit case and is detachably and mechanically connected to the socket 13, a sixth leg (not shown) which is fixed to the display unit case and is detachably and rotatably connected to the base unit 3 in the leg mounted groove 23, a pair of fifth latches 101 respectively engaged with the pair of holes in both ends of the keyboard unit 11, a pair of third springs 99 for causing the display unit 7 to hop up, and a pair of third slide buttons 103 for respectively actuating the pair of fifth latches 101. A fourth connector is fixed in the fifth leg 93. When the fifth leg 93 is mechanically connected to the socket 13, the fourth connector electrically connected to the first connector 17 is fixed in the fifth leg 93. A third rotatable lever is rotatably fixed to the fifth leg 93. The third rotatable lever has a pair of sixth latches which are respectively engaged with the pair of holes in the front surface of the socket 13.

Figure 3:
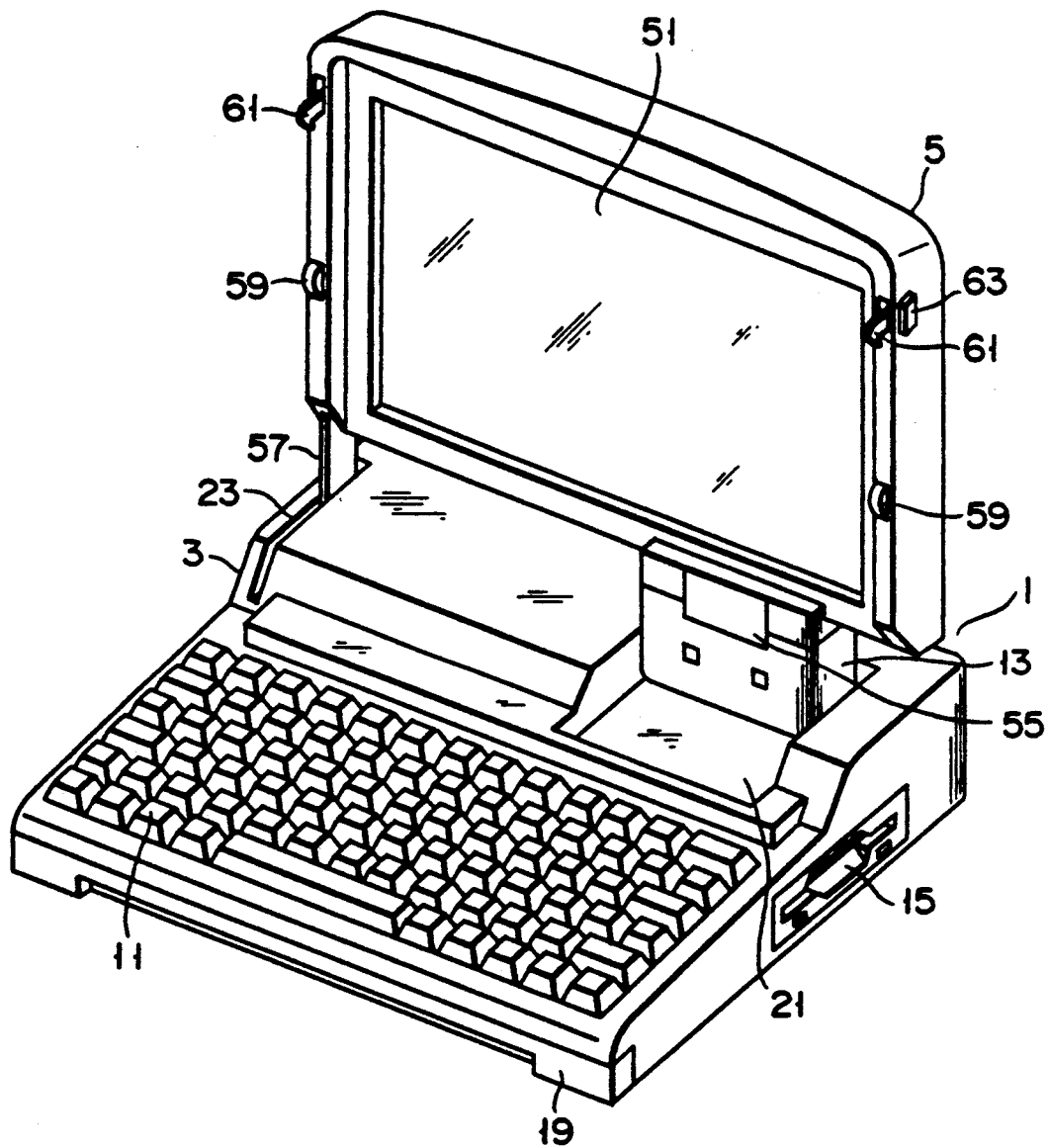
FIG. 3 is a perspective view, showing an outer appearance of the system, for explaining an arrangement in a case wherein one of a plurality of types of flat panel display units is connected to a main body.
Figure 4:
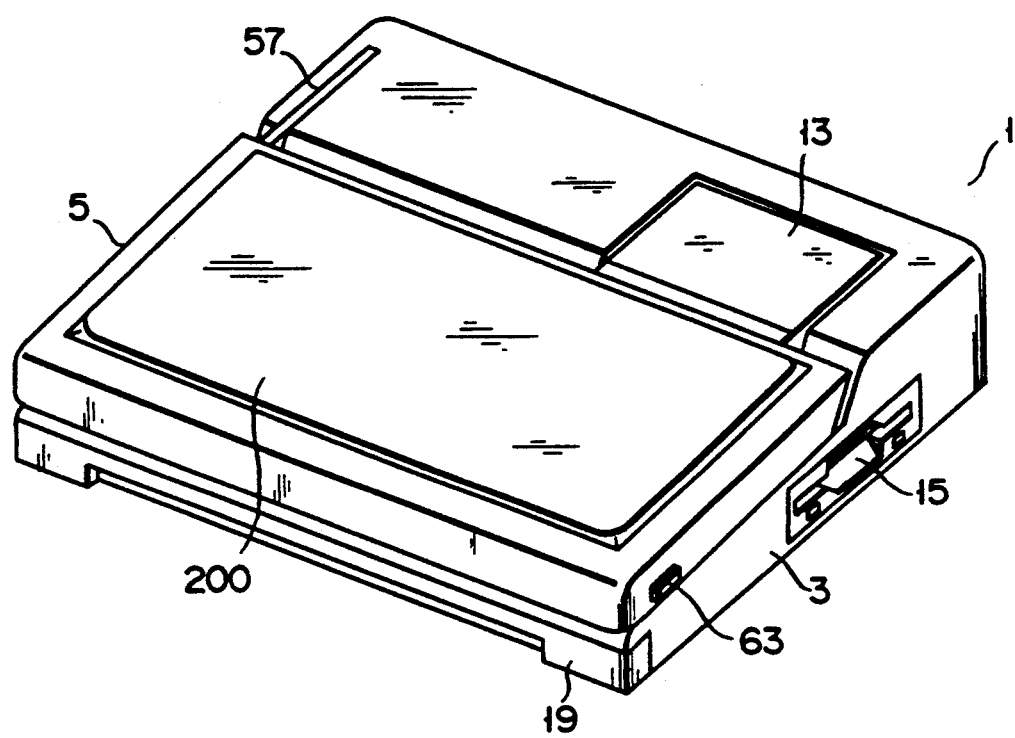
FIG. 4 is a perspective view, showing an outer appearance of the system, for explaining a state in which the flat panel display unit in FIG. 3 is closed.

When one of the display units 5, 7, and 9 is selected to be mechanically and electrically connected to the base unit 3, the base unit 3 can be used as a laptop PC. FIGS. 3 and 4 are perspective views respectively showing outer appearances of the system when the back-light type liquid crystal display unit 5 is electrically and mechanically connected to the base unit 3. When the display unit 5 is mechanically and electrically connected to the base unit 3, the display unit 5 can be pivoted between an open position to allow an operator to see the display screen and a closed position where the display unit 5 covers the keyboard unit 11. Similarly, when the reflection type liquid crystal display unit 7 or the color type liquid crystal display unit 9 is electrically and mechanically connected to the base unit 3, the display unit 7 or 9 can be pivoted between the open position to allow an operator to see the display screen and the closed position where the display unit 7 or 9 covers the keyboard unit 11.

In this embodiment, each display unit has two legs. In the system of the present invention, however, each display unit and the base unit are not limited to specific structures as long as each display unit can be rotatably, electrically, and mechanically connected to the base unit.

Figure 2:
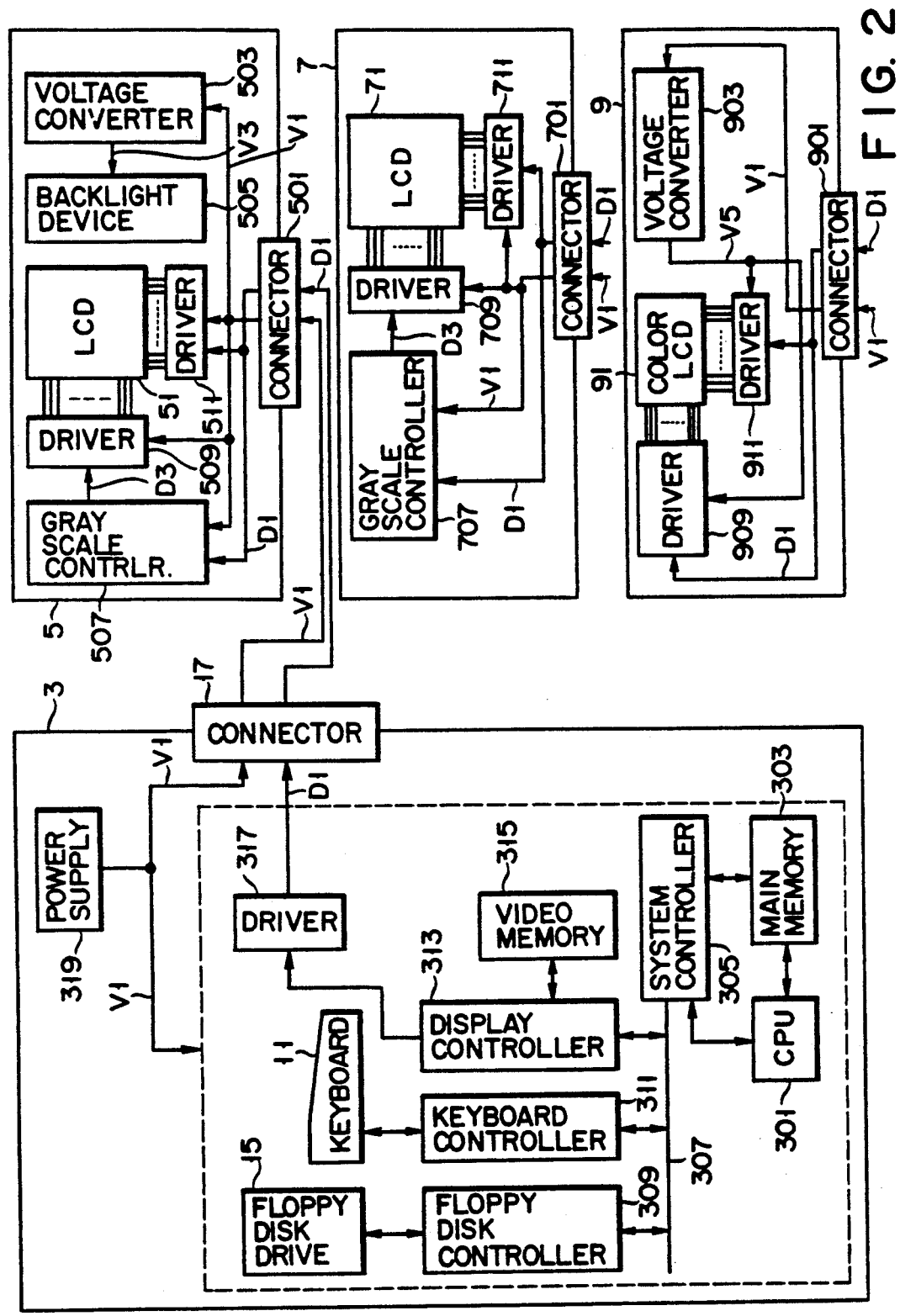
FIG. 2 is a block diagram for explaining an arrangement of the system of the present invention.

FIG. 2 is a block diagram for explaining a circuit arrangement of the system of the embodiment. The base unit 3 includes a circuit module enclosed with a dotted line in FIG. 2, a power supply 319 for applying a reference voltage V1 through the circuit module and the connector 17 to a display unit connected to the base unit 3, a keyboard 11, and a floppy disk drive 15. A CPU 301 performs data processing. A main memory 303 stores data to be processed by the CPU 301. A display controller 313 controls an operation of a display unit connected to the base unit 3. A video memory 315 stores data to be displayed on the display screen of a display unit connected to the base unit 3. A keyboard controller 311 controls an operation of the keyboard 11. A floppy disk controller 309 controls an operation of the floppy disk drive 15. A system controller 315 controls operations of the keyboard controller 311, the floppy disk controller 309, the display controller 313, the CPU 301, and the main memory 303 which are connected to the system controller 305 through an internal bus 307. A driver 317 sends display data D1 output from the display controller 313 through the connector 17 to a display unit connected to the base unit 3.

The back-light type liquid crystal display unit 5 includes a second connector 501. The second connector is electrically connected to the first connector 17 when the first leg 53 is mechanically connected to the socket 13. The display unit 5 includes a voltage converter 503. The voltage converter 503 is electrically connected to the second connector 501, and receives the reference voltage V1 from the power supply 319 through the first and second connectors 17 and 501. The voltage converter 503 converts the reference voltage V1 into a back-light driving voltage V3. The display unit 5 includes a back-light device 505 having a fluorescence-luminescence panel or an electroluminescence panel. The back-light device 505 is electrically connected to the voltage converter 503, and receives the back-light driving voltage V3 from the voltage converter 503. Upon reception of the back-light driving voltage V3, the back-light device 505 radiates light on the back-light type liquid crystal display 51 from its rear surface. The display unit 5 includes a gray scale controller 507. The gray scale controller 507 is electrically connected to the second connector 501, and receives the display data D1 and the reference voltage V1 from the driver 317 and the power supply 319, respectively, through the first and second connectors 17 and 501. The gray scale controller 507 is driven by the reference voltage V1, and converts the display data D1 into display data D3 having gray scale data. The display unit 5 includes drivers 509 and 511. The driver 509 is electrically connected to the gray scale controller 507 and the second connector 501, and receives the reference voltage V1 from the power supply 319 through the first and second connectors 17 and 501 and the display data D3 supplied from the gray scale controller 507. The driver 509 is driven by the reference voltage V1, and controls rows of the liquid crystal display 51 in accordance with the display data D3. The driver 511 is electrically connected to the second connector 501, and receives the reference voltage V1 and the display data D1 from the power supply 319 and the driver 317, respectively, through the first and second connectors 17 and 501. The driver 511 is driven by the reference voltage V1 and controls columns of the liquid crystal display 51 in accordance with the display data D1. With the above-described arrangement, the back-light type liquid crystal display unit 5 can display monochrome data having gray scale data on the back-light type liquid crystal display 51.

The reflection type liquid crystal display unit 7 includes a third connector 701. The third connector 701 is electrically connected to the first connector 17 when the third leg 73 is mechanically connected to the socket 13. The display unit 7 includes a gray scale controller 707. The gray scale controller 707 is electrically connected to the third connector 701, and receives display data D1 and the reference voltage V1 from the driver 317 and the power supply 319, respectively, through the first and second connectors 17 and 701. The gray scale controller 707 is driven by the reference voltage V1, and converts the display data D1 into display data D3 having gray scale data. The display unit 7 includes drivers 709 and 711. The driver 709 is electrically connected to the gray scale controller 707 and the third connector 701, and receives the reference voltage V1 from the power supply 319 through the first and third connectors 17 and 701, and the display data D3 from the gray scale controller 707. The driver 709 is driven by the reference voltage V1, controls rows of the liquid crystal display 71 in accordance with the display data D3. The driver 711 is electrically connected to the third connector 701, and receives the reference voltage V1 and the display data D1 from the power supply 319 and the driver 317, respectively, through the first and third connector 17 and 701. The driver 711 is driven by the reference voltage V1, and controls columns of the liquid crystal display 71 in accordance with the display data D1. With the above-described arrangement, the reflection type liquid crystal display unit 7 can display monochromatic data having gray scale data on the reflection type liquid crystal display 71.

The color type liquid crystal display unit 9 includes a fourth connector 901. The fourth connector 901 is electrically connected to the first connector 17 when the fifth leg 93 is mechanically connected to the socket 13. The display unit 9 includes a voltage converter 903. The voltage converter 903 is electrically connected to the fourth connector 901, and receives the reference voltage V1 from the power supply 319 through the first and fourth connectors 17 and 901. The voltage converter 903 converts the reference voltage V1 into a voltage V5 for driving the color liquid crystal display 73. The display unit 9 includes drivers 909 and 911. The driver 909 is electrically connected to the fourth connector 901 and the voltage converter 903, and receives display data D1 from the driver 317 through the first and fourth connectors 17 and 901, and the voltage V5 from the voltage converter 903. The drivers 909 and 911 are driven by the reference voltage V5, and control rows and columns of the liquid crystal display 91 in accordance with the display data D1. With the above-described arrangement, the color type liquid crystal display unit 9 can display color data on the color type liquid crystal display 91.

In the system of the present invention, the base unit 3 includes the power supply 319 for applying the reference voltage V1, and each display unit which requires a voltage other than the reference voltage V1 incorporates the converter for generating a required voltage from the reference voltage V1. Therefore, the back-light type flat panel display unit 5 and the reflection type flat panel display unit 7 can be used with one type of base unit. In addition, since the base unit 3 includes the circuit for generating display data, and each display unit which requires monochromatic display data incorporates the circuit for generating monochromatic display data from color display data, the monochromatic type flat panel display unit 5 or 7 and the color type flat panel display unit 9 can be used with one type of base unit. Moreover, in the system of the present invention, if a low voltage is used as the reference voltage V1 and is increased by the voltage converter 503 or 903 of the flat panel display unit 5 or 9, since the low voltage is to be applied to the first and fourth connectors 17 and 901, even if an operator accidentally touches the connectors when the flat panel display 5 or 9 is detached, he/she does not receives an electric shock of a high voltage.

In the embodiment, the back-light flat panel display unit 5, the reflection type flat panel display unit 7, and the color type flat panel display unit 9 are used with the single base unit 3 of the system. As another embodiment, however, only the back-light type flat panel display unit 5 and the reflection type flat panel display unit 7 can be interchangeably used in the system. In this system, the display units 5 and 7 may respectively include the gray scale controllers 507 and 707, or the base unit 3 may includes one gray scale controller so as to directly supply monochromatic data to the respective display units. As still another embodiment, a plasma type flat panel display unit can be used in a system in addition to the back-light type flat panel display unit 5, the reflection type flat panel display unit 7, and the color type flat panel display unit 9.

Additional advantages and modifications will readily occur to those skilled in the art. Therefore, the invention in its broader aspects is not limited to the specific details, and representative devices, examples shown and described herein. Accordingly, various modifications may be made without departing from the spirit or scope of the general inventive concept as defined by the appended claims and their equivalents.

What is claimed is:

1. A portable computer system comprising:
a base unit including a keyboard, a power supply for supplying a standard voltage, a display controller for supplying standard display data, and a first connector electrically coupled to the power supply and the display controller for receiving the standard voltage and the standard display data;
a first display unit removably connecting to the base unit, the first display unit including a second connector removably and electrically connecting to the first connector, a first flat panel display module, and a first converter circuit comprising a first voltage converter circuit for automatically converting the standard voltage supplied by the power supply through the first and second connectors into a first inherent voltage for driving the first flat panel display module and a first data converter circuit for automatically converting the standard display data supplied by the display controller through the first and second connectors into first inherent display data for use by the first flat panel display module; and
a second display unit removably connecting to the base unit in place of the first display unit, the second display unit comprising a third connector removably and electrically connecting to the first connector, a second flat panel display module, and a second converter circuit comprising one of a second voltage converter circuit for automatically converting the standard voltage supplied by the power supply through the first and third connectors into a second inherent voltage for driving the second flat panel display module and a second data converter circuit for automatically converting the standard display data supplied by the display controller through the first and third connectors into second inherent display data for use by the second flat panel display module.

2. A portable computer system according to claim 1, wherein the first flat panel display module comprises a back-light type gray scale liquid crystal display and a back-light device, the first inherent display data being gray scale data for use by the back-light type gray scale liquid crystal display, and the first inherent voltage being a back-light voltage for driving the back-light device.

3. A portable computer system according to claim 2, wherein the second flat panel display module comprises a color liquid crystal display, the standard display data being provided to the color liquid crystal display from the display controller through the first and second connectors, and the second inherent voltage being a color display voltage for driving the color liquid crystal display.

4. A portable computer system according to claim 2, wherein the second flat panel display module comprises a reflection-type gray scale liquid crystal display, the standard voltage being provided to the reflection-type gray scale liquid crystal display from the power supply through the first and second connectors, and the second inherent display data being the gray scale data for use by the reflection-type gray scale liquid crystal display.

5. A portable computer system comprising:
a base unit including a keyboard, a power supply for supplying a standard voltage, a display controller for supplying color display data, and a first connector electrically coupled to the power supply and the display controller;
a first flat panel display unit removably connecting to the base unit, the first flat panel display unit comprising a second connector removably connecting to the first connector, a first gray scale converter circuit electrically coupled to the second connector, a gray scale liquid crystal display device electrically coupled to the first gray scale converter circuit, a first voltage converter circuit electrically coupled to the second connector, and a back-light device electrically coupled to the first voltage converter circuit, the first gray scale converter circuit automatically converting the color display data supplied by the display controller through the first and second connectors into first gray scale display data for use by the gray scale liquid crystal display device, and the first voltage converter circuit automatically converting the standard voltage supplied by the power supply though the first and second connectors into a first special voltage for driving the back-light device;
a second flat panel display unit removably connecting to the base unit in place of the first flat panel display unit, the second flat panel display unit comprising a third connector removably connecting to the first connector, a color liquid crystal display module electrically coupled to the third connector, and a second voltage converter circuit electrically coupled to the third connector, the color display data being provided to the color liquid crystal display module form the display controller through the first and second connectors, and the second voltage converter circuit automatically converting the standard voltage provided by the power supply through the first and third connectors into a second special voltage for driving the color liquid display module.

6. A portable computer system according to claim 5, further comprising a third flat panel display unit removably connecting to the base unit in place of one of the first and second flat panel display units, the third flat panel display unit comprising a fourth connector removably connecting to the first connector, a reflection-type gray scale liquid crystal display device electrically coupled to the fourth connector, and a second gray scale converter circuit electrically coupled to the fourth connector, the reflection-type gray scale liquid crystal display device being driven by the standard voltage provided through the first and fourth connectors, and the second gray scale converter circuit automatically converting the color display data into second gray scale display data for use by the reflection-type gray scale liquid crystal display device.

* * * * *